US009446375B2

(12) United States Patent
Kulkarni et al.

(10) Patent No.: US 9,446,375 B2
(45) Date of Patent: Sep. 20, 2016

(54) CONTINUOUS MODULAR REACTOR

(71) Applicant: Council of Scientific & Industrial Research, New Delhi (IN)

(72) Inventors: Amol Arvind Kulkarni, Pune (IN); Vivek Vinayak Ranade, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 133 days.

(21) Appl. No.: 14/351,834

(22) PCT Filed: Oct. 15, 2012

(86) PCT No.: PCT/IB2012/002046
§ 371 (c)(1),
(2) Date: Apr. 14, 2014

(87) PCT Pub. No.: WO2013/054180
PCT Pub. Date: Apr. 18, 2013

(65) Prior Publication Data
US 2014/0255265 A1 Sep. 11, 2014

(30) Foreign Application Priority Data

Oct. 14, 2011 (IN) .......................... 2957/DEL/2011

(51) Int. Cl.
*B01J 19/24* (2006.01)
(52) U.S. Cl.
CPC ............. *B01J 19/243* (2013.01); *B01J 19/242* (2013.01); *B01J 2219/0002* (2013.01); *B01J 2219/00033* (2013.01); *B01J 2219/1944* (2013.01); *B01J 2219/24* (2013.01)

(58) Field of Classification Search
CPC B01J 19/24; B01J 19/243; B01J 2219/1944; B01J 2219/24
USPC ........................................... 422/211
See application file for complete search history.

(56) References Cited

U.S. PATENT DOCUMENTS

| 3,526,099 A * | 9/1970 | Jannot et al. ............. 62/88 |
| 4,931,225 A * | 6/1990 | Cheng ................. 261/76 |
| 2010/0093982 A1* | 4/2010 | Henzler et al. ........... 530/419 |

FOREIGN PATENT DOCUMENTS

| WO | WO 01/36514 A1 | 5/2001 |
| WO | WO 2007/054293 A1 | 5/2007 |
| WO | WO 2007/065211 A1 | 6/2007 |

* cited by examiner

*Primary Examiner* — Huy-Tram Nguyen
(74) *Attorney, Agent, or Firm* — Knobbe, Martens, Olson & Bear, LLP

(57) ABSTRACT

The present invention discloses a flow reactor composed of plurality of modular/fluidic components that helps retain agility and re-configurability of the continuous chemical processes with improved processing ability. More specifically, disclosed herein is a continuous flow reactor composed of varied permutations and combinations of a plurality of modular/fluidic components for chemical processing. The components are connected to each other using connectors that facilitate the connection of either with two or more, similar or different components.

11 Claims, 6 Drawing Sheets

CONTINUOUS MODULAR REACTOR

FIELD OF THE INVENTION

The present invention relates to a flow reactor composed of plurality of fluidic components which helps retain agility and re-configurability of the continuous chemical processes with improved processing ability. More specifically, the invention relates to a continuous reactor composed of varied permutations and combinations of a plurality of modular elements for chemical processing. The components are connected to each other using connectors that facilitate the connection of either two or more, similar or different components.

BACKGROUND OF THE INVENTION

Continuous reactors are perceived to be inflexible and less agile in process modifications. Many multi-product manufacturing therefore prefer batch processing. Batch processing plants are typically arranged to operate in a batch mode with necessary requirement of additional large batch tanks. Product quality in batch processing may vary from batch to batch when compared to the same process being carried out in a continuous operation. Furthermore, the proportional increase in operating and maintenance costs combined with the other shortcomings of batch processing indicate the need for a more flexible and efficient alternative.

Continuous flow reactor is being used over decades. However the nature of the reactor has largely been like a simple tubular reactor with either straight (U.S. Pat. No. 7,018,591, US20030055300), tubes connected using 180° bends (U.S. Pat. No. 5,779,994, U.S. Pat. No. 3,773,470, U.S. Pat. No. 3,148,037), the helical, lamellar or spiral configuration. A few configurations with inserts have also been used (US20100040190). The purpose of using these configurations was either to achieve the desired residence time and/or to achieve the desired residence time with reduced axial dispersion by using the geometrical variations to perturb the flow to enhance local mixing. However these configurations do not bring out a significant impact on the enhancement of reactor performance.

There exists a need for an efficient system for carrying out processes in a simple, quick and reconfigurable manner.

OBJECT OF THE INVENTION

Therefore an object of the invention is to provide a modular and efficient system for carrying out processes in a simple, quick and reconfigurable manner.

SUMMARY OF THE INVENTION

In accordance with the object, the present invention provides novel modular reactor design that helps retain agility and re-configurability of the continuous processes with better processing ability via intensification of mixing and reaction.

In an aspect, the present invention discloses flow reactor assembly comprising a tubular reactor consisting of at least one metallic or non-metallic fluidic/modular component selected from helical coils, flow disrupter, vortex diode arranged in varied permutations and combinations. The fluidic/modular components may be arranged together in any numbers and any arrangement having single or multi feed options, in periodic or aperiodic sequences. Further, they are connected to each other using connectors that facilitate the connection with two or more similar or different components in periodic or aperiodic sequences.

In an aspect, the individual modular/fluidic components can have identical or different axis of symmetry.

Accordingly, present invention provides a flow reactor assembly that helps retain agility and re-configurability of the continuous chemical processes with improved processing ability comprising a tubular reactor consisting of at least one metallic or non-metallic fluidic/modular components selected from the group of helical coils [1], flow disrupters [2], vortex diodes [3] optionally having internals flow divider, wherein, said fluidic/modular components can be arranged together in varied numbers and arrangement having single or multi feed inlets, in periodic or aperiodic sequences; wherein said tubular reactor along with plurality of metallic or non-metallic fluidic components achieved the desired residence time, reduced axial dispersion, enhanced the intensity of local mixing and chemical reaction.

In an embodiment, present invention provides a flow reactor wherein each of the fluidic component further comprises multiple metallic and non-metallic fluidic elements having respective inlet and outlet ports.

In yet another embodiment, present invention provides a flow reactor wherein the said fluidic components are connected to each other using connectors that facilitate the connection with two or more, similar or different components in periodic or aperiodic sequences.

In yet another embodiment, present invention provides a flow reactor wherein flow disrupter [2] comprises internals having respective inlet and outlet ports; longitudinal variation in the open flow area, plurality of metallic and non-metallic components in different possible sequences.

In yet another embodiment, present invention provides a flow reactor wherein said flow disrupter [2] have a shape selected from cylindrical or polygonal such as triangular, square or pentagonal, cross-sectional or a polyhedral cavity with or without spatial variation in the internal flow area and with suitable input and output connectable ports with the helical coil elements.

In yet another embodiment, present invention provides a flow reactor wherein vortex diode [3] optionally with internals comprising metallic or non-metallic, single or multiple tangential ports of the diode as inlet and an axial port as outlet and having connectable ports with the helical coil elements.

In yet another embodiment, present invention provides a flow reactor wherein the helical coils [1] in the reactor have variable radii of curvature, pitch and diameter connected to each other either in the same or different axis of symmetry for different coils with single or multiple inlets for the assembly.

In yet another embodiment, present invention provides a flow reactor wherein the helical coils [1] are in combination with different coil diameter, wherein the smaller coil is held inside or outside the volume occupied by the larger one with identical or non-identical axis of symmetry for the individual coils.

In yet another embodiment, present invention provides a flow reactor wherein a periodic and aperiodic sequence of coils of identical curvature and similar tube diameter are connected with non-cylindrical segments with single point as well as multi point feeding system.

In yet another embodiment, present invention provides a flow reactor wherein a periodic and aperiodic sequence of coils of similar radii of curvature with endpoints attached to another coil having different radius of curvature and similar and different tube diameter and pitch.

In yet another embodiment, present invention provides a flow reactor wherein a periodic and aperiodic sequence of helical coils [1] having different radius of curvature and similar and different tube diameter with single point or multi point feed.

In yet another embodiment, present invention provides a flow reactor wherein a periodic and aperiodic sequence of helical coils [1] having similar or different radius of curvature and similar or different pitch and similar and different tube diameter at 180 degrees.

In yet another embodiment, present invention provides a flow reactor wherein a periodic and aperiodic sequence of helical coils [1] having similar radius of curvature is connected with vortex diodes in a single point and multi point feed arrangement.

In yet another embodiment, present invention provides a flow reactor wherein a periodic and aperiodic sequence of helical coils [1] having similar radius of curvature is connected with vortex diode and flow disrupter in a single point and multi point feed arrangement.

In yet another embodiment, present invention provides a flow reactor wherein individual modular/fluidic components can have identical or different axis of symmetry.

In yet another embodiment, present invention provides a flow reactor assembly that helps retain agility and re-configurability of the continuous chemical processes with improved processing ability comprising a tubular reactor consisting of at least one metallic or non-metallic fluidic/modular components selected from the group of helical coils [1], flow disrupters [2], vortex diodes [3] optionally having internals, wherein, said fluidic/modular components can be arranged together in varied numbers and arrangement having single or multi feed inlets, in periodic or aperiodic sequences;

wherein, each of the fluidic component further comprises multiple metallic and non-metallic fluidic elements having respective inlet and outlet ports;

wherein, the said fluidic components are connected to each other using connectors that facilitate the connection with two or more, similar or different components in periodic or aperiodic sequences.

DETAILED DESCRIPTION OF FIGURES

Figure 1:
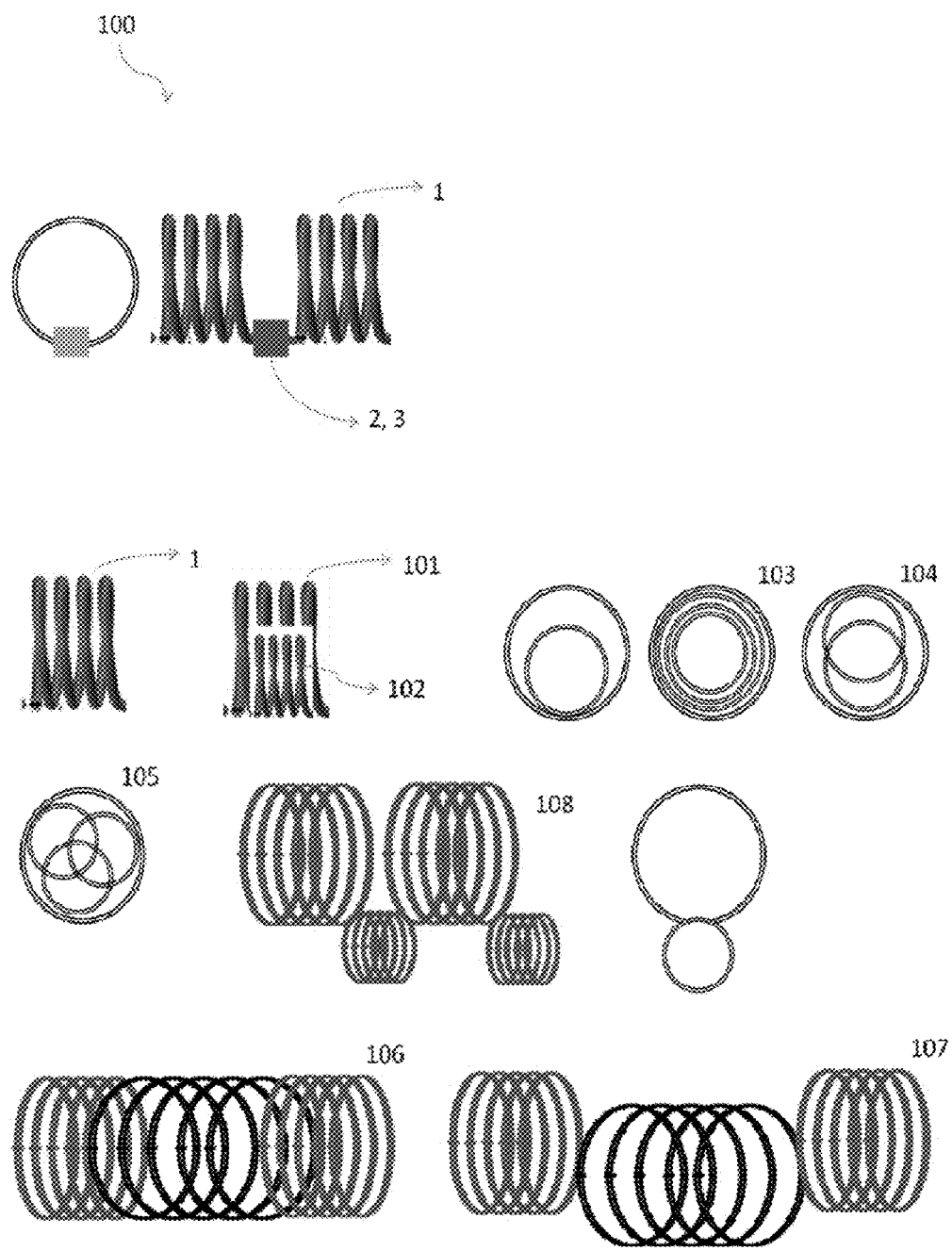
FIG. 1: illustrates a helical coil.

Component [201] includes a combination of two segments [212] having same end size as that of a helical coil or other flow disrupter elements [2] or a vortex diode [3] between which another straight segment [210] is sandwiched having either higher or lower flow area [211] straight flow paths with varying flow area and their combinations [213, 214].

In another embodiment of the flow disrupter [2], the element [210] can have a flow area comprising of two converging sections [301] with the convergent ends either attached directly [302] or through a spacing [303] or the flow area can have the form of two diverging sections attached to each other at the enlarged area [203] with smaller sections connected to the connecting element [212].

In another embodiment of the flow disrupter [2], the element [210] can have a flow area comprising of two converging sections [301] with the convergent ends either attached directly [302] or through a spacing [303] or the converging end of one converging section is connected to the larger section of the subsequent converging segment [204] or the spacing in the embodiment [303] is extended to the wall [501] and connected [205] to another helical coil [1] or the flow area can have the form of two diverging sections attached to each other at the enlarged area through a spacer [203] or directly [206] the with straight flow segments of the connecting element [212].

In another embodiment of the flow disrupter [2], the element [207] can have a step reduction [701] in the flow area [207] or a sequence of converging segments [208A] of [204] or [209] of [206] or the [208A] such that every single converging segment having an internal flow divider [802] either in conical or cylindrical [803] shape connecting to the straight flow segments of the connecting element [212].

In another embodiment of the flow disrupter [2], the element [210] can have a single [211] or multiple [210] cylindrical obstacles having circular cross-section having the axis of symmetry aligned with the connecting element [212] or not aligned [213] with the connecting element [212]. The flow area of the cylindrical inserts may or may not be equal to the flow area of the connecting element [212].

In another embodiment of the flow disrupter [2], the element [210] can be a helical screw [121] with constant pitch with the threads having bores. The presence of screw helps to induce a tangential motion inside the flow disrupter [2] while the bores in the screw help achieve local mixing.

A vortex diode [3] is a fluidic element [801] having a chamber [806], a tangential inlet [804] and an axial outlet [805]. The element [801] can be connected to the helical coil [1] through its tangential inlet [804] and the axial outlet [805]. The embodiment can have two [802] or four [803] tangential inlets attached to the chamber [806] and one axial outlet [805]. The fluid entering through the tangential inlets [804] undergoes a vortex formation thereby enhancing mixing in the chamber [806] and leaves the embodiment [8] through the axial outlet [805]

DETAILED DESCRIPTION OF INVENTION

Continuous tubular reactors usually have relatively higher heat transfer area than the batch reactors of same volume. This gives an advantage of better heat transfer properties thereby helping to carry out the reactions at relatively higher rates either by increasing the reactor temperature or by using higher concentrations of the reactants. The extent of reactions in a continuous tubular reactor can be manipulated by controlling the residence time. With re-configurability, agility and flexibility of manufacturing, the present invention discloses novel construction of continuous flow reactors with enhanced modularity provided by modular/fluidic components that can be arranged in various permutations and combinations.

Accordingly, the present invention provides a continuous flow reactor assembly which comprises of at least one metallic or non-metallic viz. glass, polymer, ceramic, composites, etc. fluidic components. The components are connected to each other using connectors that facilitate the connection either with two or more similar or different components The individual components can have identical or different axis of symmetry The continuous flow reactor of the present invention helps retain agility and re-configurability of the continuous processes and also facilitates in achieving desired residence time, reducing axial dispersion and enhancing mixing and reaction. The modular/fluidic components can be chosen from a variety of helical coils, flow disrupters and vortex diodes.

In a preferred embodiment, the present invention relates to a flow reactor assembly that helps retain agility and re-configurability of the continuous chemical processes with improved processing ability comprising a tubular reactor consisting of at least one metallic or non-metallic fluidic/modular components selected from the group of helical coils [1], flow disrupters [2], vortex diodes [3] optionally having internals, wherein, said fluidic/modular components can be arranged together in varied numbers and arrangement having single or multi feed inlets, in periodic or aperiodic sequences; wherein, each of the fluidic component further comprises multiple metallic and non-metallic fluidic elements having respective inlet and outlet ports;

wherein, the said fluidic components are connected to each other using connectors that facilitate the connection with two or more similar or different components in periodic or aperiodic sequences;

wherein, said tubular reactor along with said plurality of metallic or non-metallic fluidic components achieved the desired residence time, reduced axial dispersion, enhanced the intensity of local mixing and chemical reaction.

The fluidic components of the reactor are comprised of individual parts that are referred to as 'fluidic elements'.

The individual modular/fluidic components can have identical or different axis of symmetry.

The tubular reactor in the present invention can be of varied geometries consisting of single or multiple type of metallic or non-metallic fluidic/modular components selected from the group of helical coils [1], flow disrupters [2], vortex diodes [3] optionally having internals.

In an embodiment [100], the present invention discloses a plurality of fluidic/modular components arranged in varied permutations and combinations selected from a variety of helical coils [1], flow disrupters [2] and vortex diodes [3]. These may be arranged together in any numbers and any arrangement having single or multi feed options, in periodic or aperiodic sequences.

A simple helical coil is known to generate secondary flows due to imbalance of forces acting on the fluid. While the secondary flows, to some extent, help achieve better mixing, they also yield more of a plug flow nature if the coils are very long and have large radius of curvature. Hence it is necessary to incorporate spatial variations in the nature of flow so that periodic or aperiodic variations in the flow would help reduce the axial dispersion and achieve rapid mixing. With the easy methods of connecting the components, it yields a relatively flexible approach to create such combinations to achieve the desired extent of mixing in a simple manner.

Accordingly, as illustrated in FIG. 1, a helical coil [1] made of tubes having specific constant radius, radius of curvature, pitch and orientation that may be used in combination with helical coils with identical coil diameter in having the pitch (T[101]/T[102]~0.1-10) with the smaller coil held inside or outside the volume occupied by the larger one either with identical [103, 106] or non-identical [104, 105, 107] axis of symmetry for the individual coils. The end connections are designed in such a way that they realize modularity in connecting the unit with other modules.

The helical coils may be used either standalone or in combination with flow disrupters and/or vortex diode and/or with combinations of helical coils of different tube radius, radius of curvature, pitch and orientation. A stand-alone helical coil typically has the problem of axial dispersion, which can be overcome by inserting either a flow disrupter [2] or a vortex diode [3]. A flow disrupter [2] would change the nature of flow in the helical coil without changing the flow direction while a vortex diode [3] would achieve the same by forcing the fluid to undergo a vortex formation, both of which reduce the effects of axial dispersion.

Figure 2:
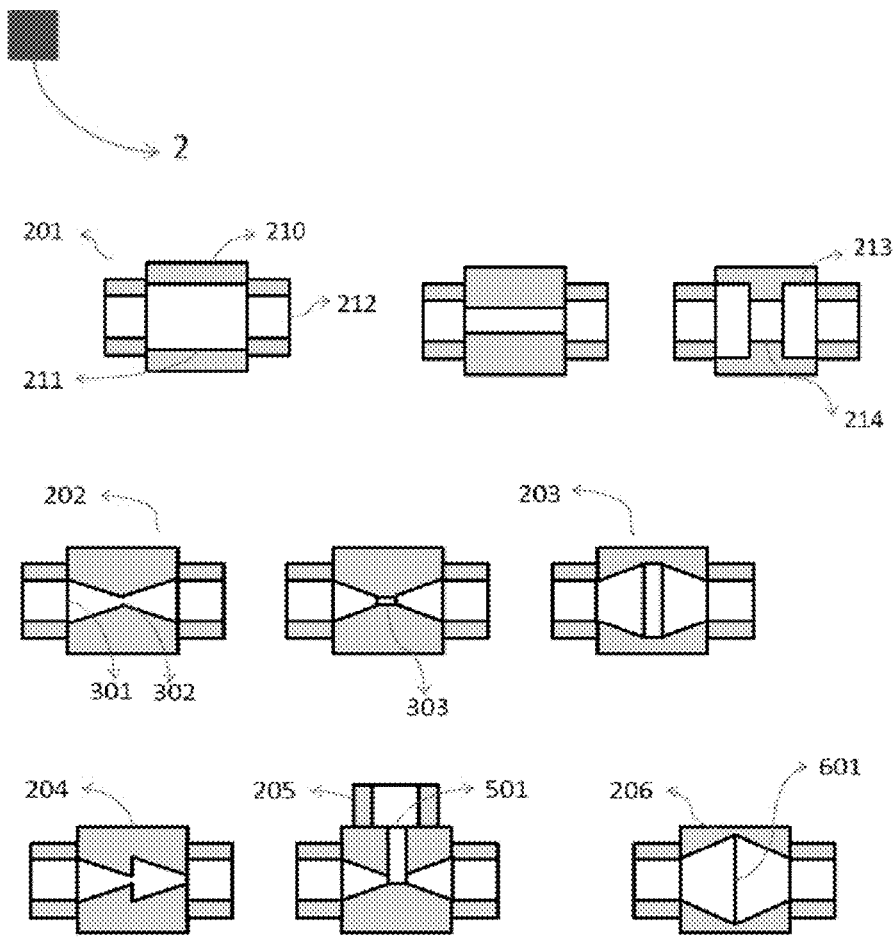
FIG. 2: illustrates various forms of flow disrupters.
Figure 2:
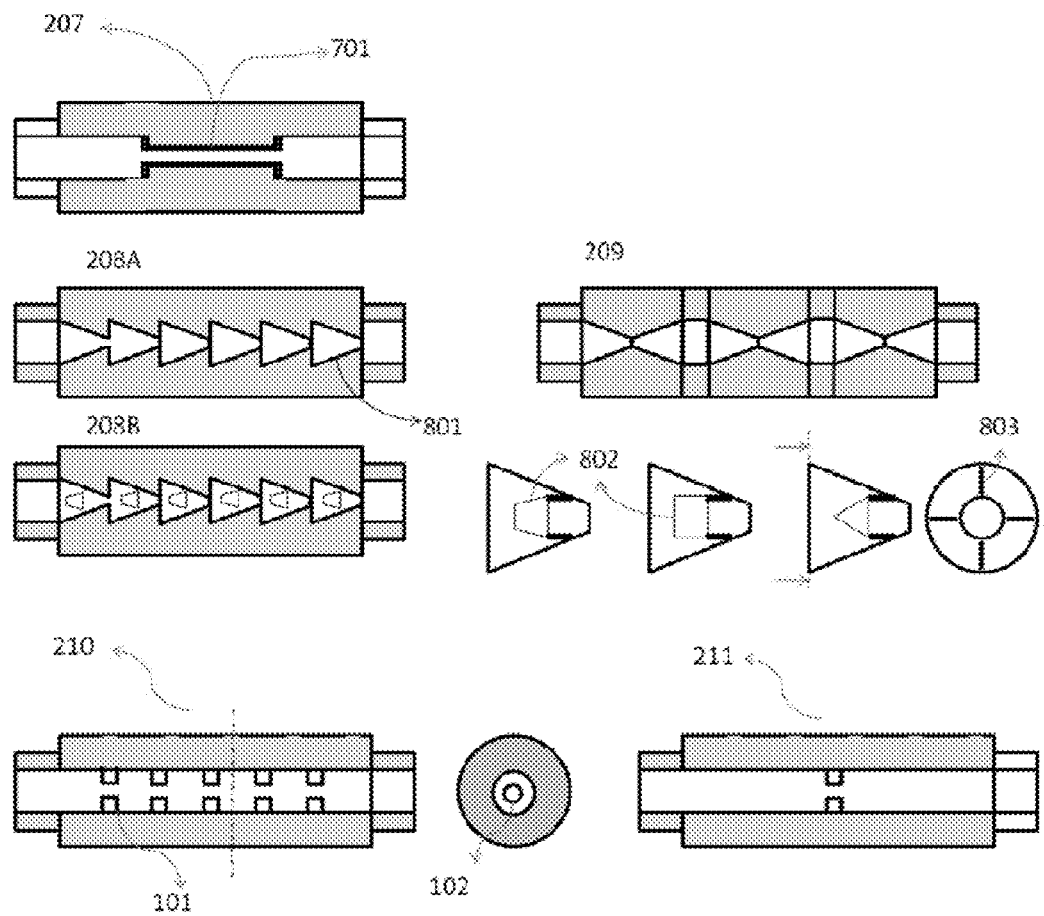
Figure 2:
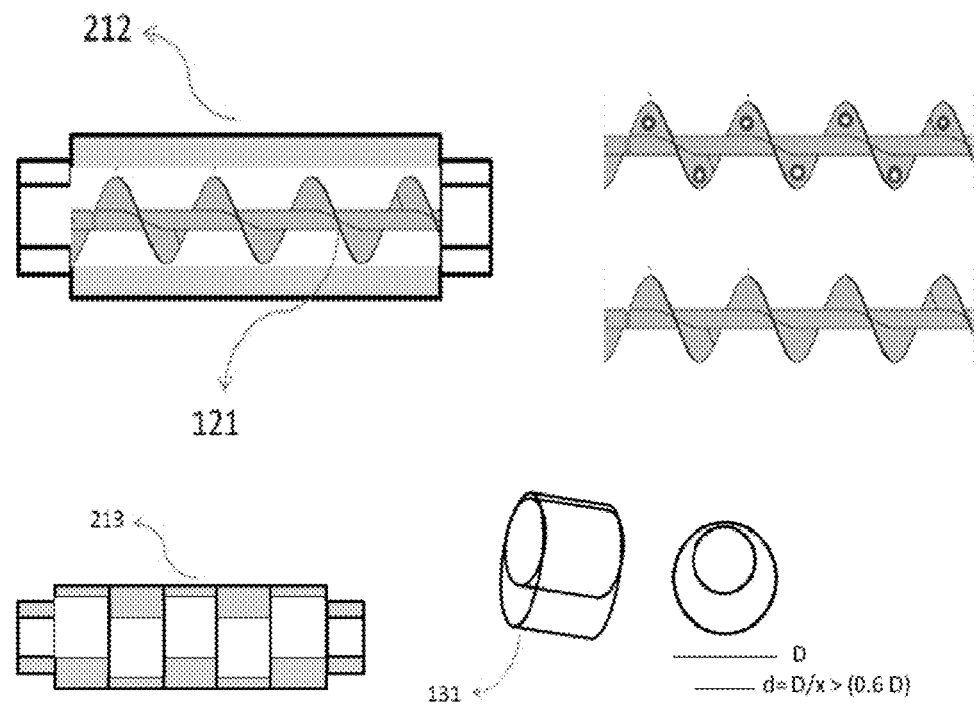

As illustrated in FIG. 2, a flow disrupter [2] may be a cylindrical or polygonal (triangular, square or pentagonal) cross-sectional or a polyhedral cavity with or without spatial variation in the internal flow area [201-213] and with suitable input and output connectable ports with the helical coil [1] elements.

The flow disrupter [2] may have internals [802] to promote mixing and dispersion. The internals rest on a porous support [803] that reduces the local flow area in a range of (5%-30%) thereby enhancing possible circulation zones. The end connections are designed in such a way that they realize modularity in connecting the unit with other modules.

Figure 3:
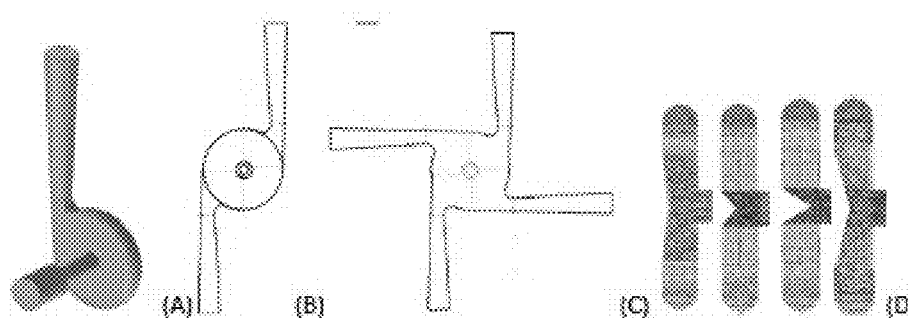
FIG. 3: illustrates various forms of vortex diodes.

As illustrated in FIG. 3, a vortex diode, that can be of any size with aspect ratio between 3 and 7, with aspect ratio defined as the ratio of diameter of the chamber to its height, is an apparatus only used with tangential port as inlet and the axial port as outlet. The vortex diode has a high resistance to flow in one direction and a low resistance to flow in the other. It may be used as leaky non return valve in applications, where it is desirable to avoid valves with moving parts. The module may have one or more tangential inlets. The module may also have internals to promote the vortex strength. The vortex diode generates cavitation conditions under certain inlet flow rate range when fluid enters through the tangential inlet. The diodes help in enhancing the reaction rates for the case of reacting flows. They also help in generating secondary oxidizing agents due to cavity break-up. The cavitation helps enhance the local temperature and pressure inside the diode leading to enhanced reaction rates. FIG. 3 (A) illustrates a 3D image of a vortex diode while 3(B) and 3(C) depict variants with multiple tangential inlet/outlet ports. FIG. 3(D) illustrates chambers with conical inserts having different base diameter and height.

In an embodiment, the present invention disclose flow reactor wherein the fluidic/modular components selected from helical coils [1], flow disrupters [2] and vortex diodes [3] in the tubular reactor may be in various combinations and are illustrated in FIGS. 4, 5, 6, 7, 8, 9 and 10. The sequence as well as the number of every module can vary depending upon the application.

Figure 4:
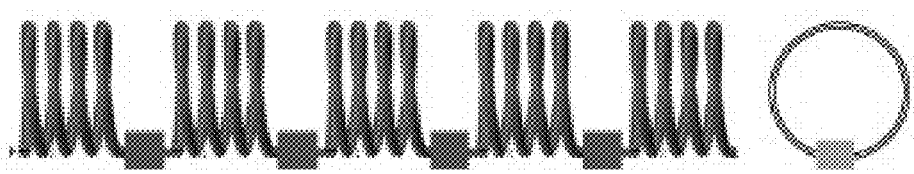
FIG. 4: illustrates a sequence of coils with identical curvature with joining segments.

In an embodiment, a periodic and aperiodic sequence of coils of identical curvature and similar tube diameter connected with non-cylindrical segments with single point as well as multi point feeding system is disclosed as illustrated in FIG. 4.

Figure 5:
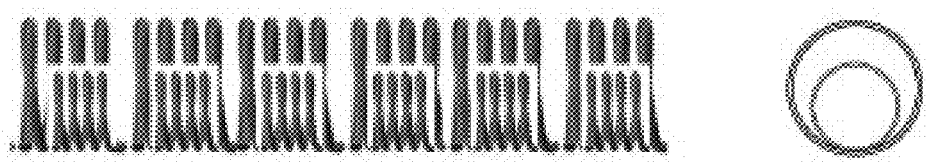
FIGS. 5 & 6: illustrate a sequence of coils with non-similar radii of curvatures with end points attached to coils having similar or non-similar radius.
Figure 6:
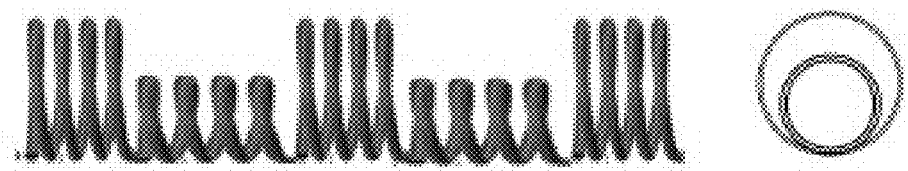
Figure 7:
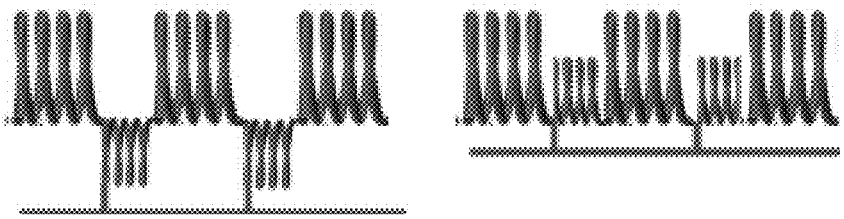
FIG. 7: illustrates periodic and aperiodic sequence of coils of different radius of curvature of similar or different tube diameter having single or multi feed points.
Figure 8:
FIG. 8: illustrates periodic and a periodic sequence of coils of different tube diameter at 180 degrees.

In another embodiment, a periodic and aperiodic sequence of coils of similar radii of curvature with endpoints attached to another coil having different radius of curvature and similar and different tube diameter and pitch as illustrated in FIGS. 5 and 6. In yet another embodiment, a periodic and aperiodic sequence of coils having different radius of curvature and similar and different tube diameter with single point or multi point feed as shown in FIG. 7. FIG. 8 disclose a periodic and aperiodic sequence of coils having similar or different radius of curvature and similar or different pitch and similar and different tube diameter at 180 degrees.

Figure 9:
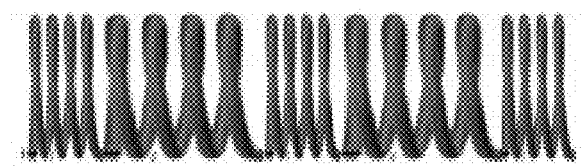
FIG. 9: illustrates periodic and aperiodic sequence of coils of different tube diameters.

In another embodiment, FIG. 9 illustrates a periodic and aperiodic sequence of different tube diameter having identical input and output port connections.

Figure 10:
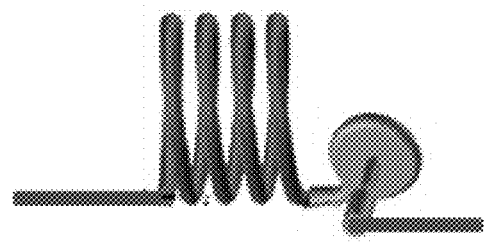
FIG. 10: illustrates sequence of coils connected via vortex diode.
Figure 10:
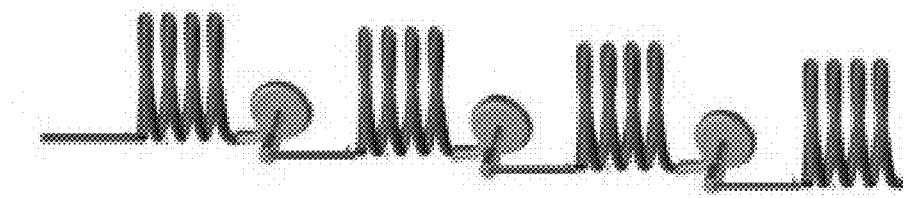

In yet another embodiment, a periodic and aperiodic sequence of coils having similar radius of curvature connected with vortex diodes in a single point feed arrangement and repetition of such an arrangement in plurality as shown in FIG. 10.

Figure 11:
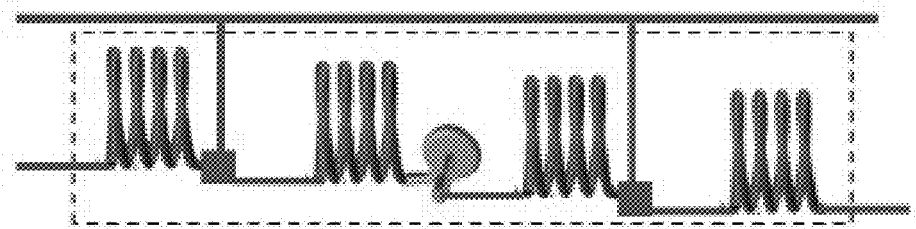
FIG. 11: illustrates sequence of coils connected to vortex diodes and flow disrupters having single or multi feed points.

FIG. 11 illustrates a periodic and aperiodic sequence of coils having similar radius of curvature connected with vortex diodes and flow disrupters in a single point and multi point feed arrangement.

Advantages of the Invention

The flow reactor comprising of tubular reactor consisting of metallic and non-metallic fluidic components selected from helical coils, flow disrupters and vortex diode of the instant invention arranged in varied combinations used in chemical processes result in providing improved processing ability by achieving desired residence time, reducing axial dispersion and enhancing the intensity of local mixing. The fluidic components help to attain agility and re-configurability of the continuous chemical processes thereof.

We claim:

1. A flow reactor assembly that helps retain agility and re-configurability of a continuous chemical process with improved processing ability comprising a tubular reactor consisting of metallic or non-metallic fluidic/modular components that are arranged together in varied numbers and arrangement having single or multi feed inlets, in periodic or aperiodic sequences; using connectors that facilitate connection with two or more similar or different components comprising:
   a helical coil element with similar or variable radii of curvature, pitch and diameter with single point or multi point feed arrangement,
   a flow disrupter comprising a cross-sectional internal flow area, wherein the flow disrupter comprises a cavity with a shape selected from the group consisting of cylindrical polygonal and polyhedral with suitable input and output connectable ports with the helical coil elements; and/or
   a vortex diode comprising metallic or non-metallic, single or multiple tangential ports of the diode as inlet and an axial port as outlet and having connectable ports with the helical coil elements;
   wherein said metallic or non-metallic fluidic/modular components optionally comprise an internal flow divider configured to achieve a desired residence time, to reduce axial dispersion, and to enhance intensity of local mixing and chemical reaction in the tubular reactor; and
   wherein the internal flow area of the flow disrupter comprises respective inlet and outlet ports, the cross-sectional internal flow area of the flow disrupter comprises a longitudinal variation, and the flow disrupter comprises a plurality of metallic and non-metallic components in different possible sequences.

2. The flow reactor according to claim 1, wherein each of the metallic or non-metallic fluidic/modular components further comprise multiple metallic and non-metallic fluidic elements having respective inlet and outlet ports.

3. The flow reactor according to claim 1, wherein the helical coil element is in combination with other coil elements of different coil diameter, wherein a smaller coil is held inside or outside the volume occupied by a larger one with identical or non-identical axis of symmetry for the individual coils.

4. The flow reactor according to claim 1, wherein a periodic and an aperiodic sequence of helical coil elements of identical curvature and similar tube diameters are connected with non-cylindrical segments comprising single point as well as multi point feeding systems.

5. The flow reactor according to claim 1, wherein a periodic and an aperiodic sequence of helical coil elements of similar radii of curvature with endpoints are attached to another coil having a different radius of curvature, wherein said different radius of curvature has a similar or a different tube diameter and pitch.

6. The flow reactor according to claim 1, wherein a periodic and aperiodic sequence of helical coil elements having similar radius of curvature is connected with vortex diodes in a single point and multi point feed arrangement.

7. The flow reactor according to claim 1, wherein a periodic and aperiodic sequence of helical coil elements having similar radius of curvature is connected with the vortex diode and the flow disrupter in a single point and multi point feed arrangement.

8. The flow reactor according to claim 1, wherein the individual metallic or non-metallic fluidic/modular components can have identical or different axis of symmetry.

9. The flow reactor assembly of claim 1, wherein the flow disrupter comprises a triangular, square or pentagonal cross-sectional internal flow area shape.

10. A flow reactor assembly that helps retain agility and re-configurability of a continuous chemical process with improved processing ability comprising a tubular reactor consisting of metallic or non-metallic fluidic/modular components that are arranged together in varied numbers and arrangement having single or multi feed inlets, in periodic or aperiodic sequences; using connectors that facilitate connection with two or more similar or different components, said components comprising:
   a helical coil element with similar or variable radii of curvature, pitch and diameter with single point or multi point feed arrangement,
   a flow disrupter comprising a cross-sectional internal flow area shape selected from the group consisting of cylindrical and polygonal, or a polyhedral cavity with or without spatial variation in the internal flow area and with suitable input and output connectable ports with the helical coil elements; and/or
   a vortex diode comprising metallic or non-metallic, single or multiple tangential ports of the diode as inlet and an axial port as outlet and having connectable ports with the helical coil elements;
   wherein said metallic or non-metallic fluidic/modular components optionally comprise an internal flow divider configured to achieve a desired residence time, to reduce axial dispersion, and to enhance intensity of local mixing and chemical reaction in the tubular reactor; and wherein the helical coil element is in combination with other coil elements of different coil diameter, wherein a smaller coil is held inside or outside the volume occupied by a larger one with identical or non-identical axis of symmetry for the individual coils.

11. A flow reactor assembly that helps retain agility and re-configurability of a continuous chemical process with improved processing ability comprising a tubular reactor consisting of metallic or non-metallic fluidic/modular components that are arranged together in varied numbers and arrangement having single or multi feed inlets, in periodic or aperiodic sequences; using connectors that facilitate connection with two or more similar or different components, said components comprising:

a helical coil element with similar or variable radii of curvature, pitch and diameter with single point or multi point feed arrangement, a flow disrupter comprising a cross-sectional internal flow area, wherein the flow disrupter comprises a cavity with a shape selected from the group consisting of cylindrical, polygonal and polyhedral, with or without spatial variation in the internal flow area and with suitable input and output connectable ports with the helical coil elements; and/or a vortex diode comprising metallic or non-metallic, single or multiple tangential ports of the diode as inlet and an axial port as outlet and having connectable ports with the helical coil elements;

wherein said metallic or non-metallic fluidic/modular components optionally comprise an internal flow divider configured to achieve a desired residence time, to reduce axial dispersion, and to enhance intensity of local mixing and chemical reaction in the tubular reactor; and wherein a periodic and aperiodic sequence of helical coil elements of similar radii of curvature with endpoints are attached to another coil having a different radius of curvature, wherein said different radius of curvature has a different tube diameter and pitch.

* * * * *